Sept. 6, 1927.  1,641,466

W. L. WRIGHT ET AL

COLOR MOTION PICTURE PHOTOGRAPHY

Filed Feb. 4, 1924  2 Sheets-Sheet 1

Inventors
Walter L. Wright and
S. Macdonald Wright
by
their Attorney

Sept. 6, 1927.

W. L. WRIGHT ET AL 1,641,466

COLOR MOTION PICTURE PHOTOGRAPHY

Filed Feb. 4, 1924   2 Sheets-Sheet 2

Inventor
Walter L. Wright and
S. Macdonald Wright by
their Attorney

Patented Sept. 6, 1927.

1,641,466

UNITED STATES PATENT OFFICE.

WALTER L. WRIGHT AND STANTON MACDONALD WRIGHT, OF LOS ANGELES, CALIFORNIA.

COLOR MOTION-PICTURE PHOTOGRAPHY.

Application filed February 4, 1924. Serial No. 690,444.

This invention relates to photography, and has particular reference to a method of handling light and an actinic body.

It is an object of this invention to provide a method useful in the production of motion picture film.

This application is directed generally to the methods or processes disclosed in our copending applications entitled Cameras, filed May 7, 1923, Serial No. 637,100, and Motion picture film, filed January 14, 1924, Serial No. 685,980, in which applications we claim the film and apparatus hereinafter disclosed.

The present invention will be best understood by reference to the accompanying drawings, in which.

Figure 1:
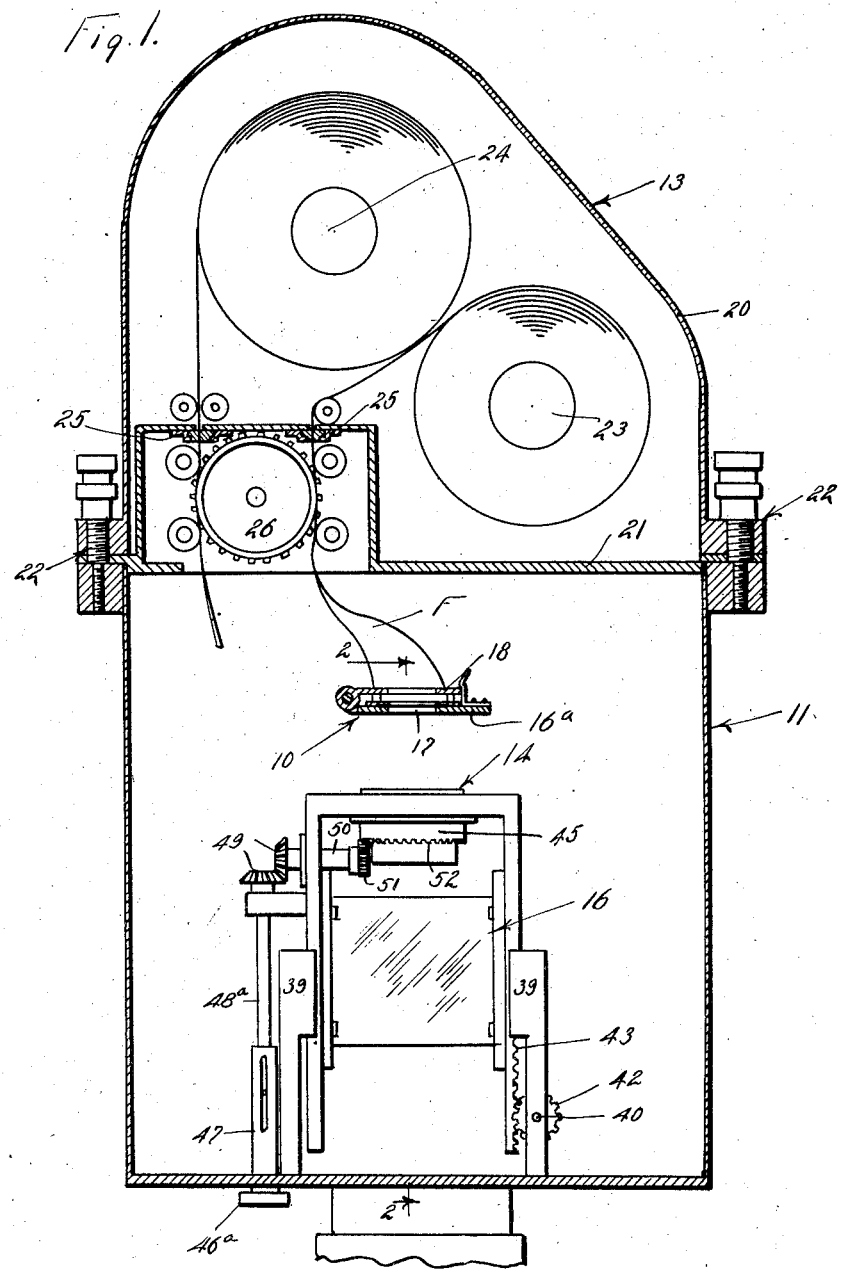
Fig. 1 is a sectional view of a camera useful in carrying out the method provided by our invention.
Figure 2:
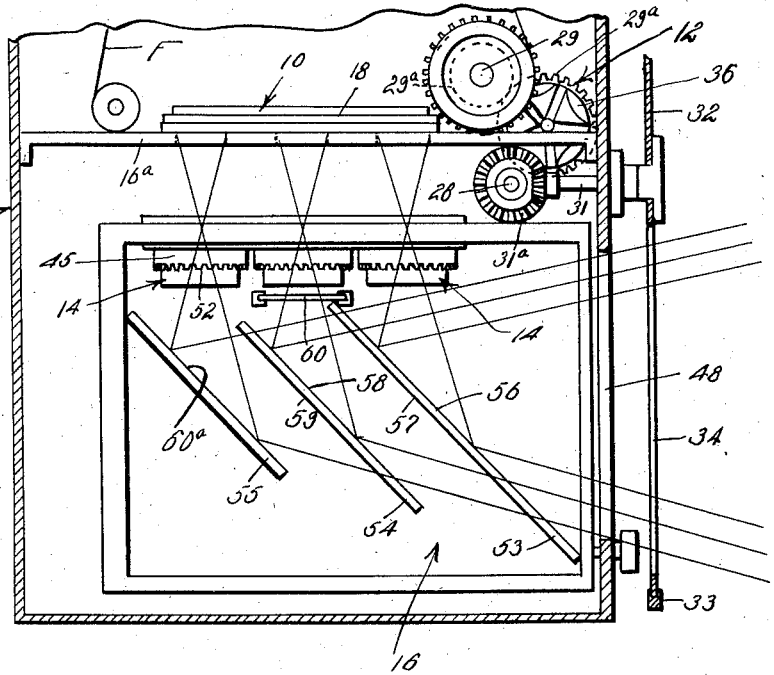
Fig. 2 is a sectional view of the camera, taken as indicated by the line 2—2 on Fig. 1.

In accordance with our present invention a single shaft of light from a subject is divided into a plurality of separated shafts of light of different colored portions or values of the subject to simultaneously expose an actinic body at a plurality of spaced parts, the relation of the shafts of light and actinic body being changed so that the body receives successive exposures and has recorded on it meshing series of exposed parts or pictures.

The method of handling the shaft of light from the subject and the relation of the several shafts obtained from the original shaft to the actinic body will be best understood from a description of a typical apparatus and manner of operation.

For the purpose of facilitating an understanding of our present method we have illustrated in the drawings a camera which is of the same general character as that set forth in our above identified copending application entitled Cameras, Serial No. 637,100, and which includes features claimed in said copending application. The camera we have illustrated in the drawings includes, generally, a film carrier 10, mounted in a suitable casing 11 to handle the film F, a movement mechanism 12 for intermittently moving the film through the carrier 10, a film magazine 13 for holding the film, lens devices 14, mounted in a carriage in spaced relation in front of the film, means 16 for directing and dividing the light from the subject so that its different parts are recorded at different points on the film, and various other parts, the description of which will follow.

The particular film carrier 10, illustrated in the drawings, includes an aperture plate 16$^a$, having a plurality of spaced exposure apertures 17, and a backing plate 18, which operates to support the film in position back of the aperture plate and in register with the apertures. The apertures are equal in width and are spaced apart distances equal to the width of one aperture. In the particular camera illustrated the film carrier is stationary and the lens devices 14 are movable or adjustable in order to effect the necessary focusing.

The casing 11 is a boxlike casing, having a suitable exposure opening 18 in its front wall and having an open top. The film magazine 13 includes a body 20 and a detachable bottom 21, the bottom 21 of the magazine is adapted to close the top of the casing and to be detachably mounted on the top of the casing by suitable screw devices 22. The film is carried in the magazine by reels 23 and 24. The reel 23 carries the unexposed film, while the reel 24 is a take-up reel to receive the film after it has been exposed. The film passes through light traps 25 in the bottom of the magazine upon passing between the magazine and casing and is fed into and out of the magazine by a feed sprocket 26.

The film moving mechanism 12 includes a drive shaft 28, a sprocket shaft 29, and a connection between the two shafts whereby the sprocket shaft is operated intermittently by continuous operation of the drive shaft. The operating shaft 28 drives a shutter shaft 31 through gears 31$^a$. The shutter 32 is mounted on the shaft 31 at the exterior of the casing and is provided with a comparatively heavy rim 33 so that it acts as a fly wheel for the mechanism 12. The shutter is provided with a suitable exposure opening 34 that cooperates with the exposure opening 18 in the casing to admit light into the casing during the period when the film is stationary. The sprocket 29 engages the film to move it through the film carrier. A connection between the drive shaft and sprocket shaft, by means of which the sprocket shaft is operated intermittently from the drive shaft, may include a simple star wheel mechanism embodying the well known type of star wheel 36 connected with the sprocket through gears 29ª and a cam device (not shown) on the drive shaft. The parts are arranged and proportioned so that the film is moved a distance corresponding to the width of three pictures every operation.

The lens devices 14, of which there is one for each exposure aperture, are mounted on the carriage 15 so that they are in front of the film carrier. The carriage 15 is mounted in the casing 11 on suitable guideways 39 so that it is removable with relation to the film carrier. The adjusting mechanism for the carriage includes a shaft 40 extending to the exterior of the casing and a gear 42 in the casing to engage a rack 43 on the carriage. The lens devices are mounted on the carriage to be in a common plane so that they are all in exactly the same focus with relation to the film. An iris mechanism 45 is provided at or in combination with each lens device; the iris mechanisms being independently adjustable from the exterior of the casing. Each iris mechanism is adapted to be operated from a knob 46ª at the outside of the casing through a sliding drive connection 47, shaft 48ª, bevel gears 49, a shaft 50, and a gear 51 which engages gear teeth 52 provided on a suitable part of the iris mechanism.

The means 16, provided to carry out the present invention, divides and directs the light entering the camera through the aperture 48 so that the parts of the film in register with the different exposure apertures are simultaneously exposed to light coming from the subject from exactly the same direction or angle so that several different colored portions or values of the subject are recorded by the said parts of the film. In the camera illustrated this means includes, generally, two light dividers, filter means, and a reflector. There is a first light divider 53, a second light divider 54, and a reflector 55. Each light divider includes a transparent plate having a front reflective surface and light filtering means in front of the rear surface. The dividers are preferably formed of glass, and the desired filtering means is either distributed throughout the glass, formed as a filament or layer in the glass between the front and rear surfaces of the glass, or carried in a body applied to the rear of the glass. The dividers are adapted to be arranged in angular positions in the shaft of light from the subject so that each reflects a distinct shaft of light carrying all of the qualities of the shaft falling upon it and passes a shaft of light effected or toned by the filtering means.

The first light divider 53 is arranged in the casing 11 immediately behind the aperture 48. This divider is in the form of a glass plate having a front reflective surface 56 suitably finished so that it is a true optical flat. The divider is angularly arranged in the casing so that the shaft of light entering the casing through the aperture 48 falls upon the front reflective surface 56 so that a portion of the light is directed through one of the lens devices 14 through one of the exposure apertures and onto one of the picture areas of the film; while the rest of the light passes to the rear surface 57, part of it being reflected off by the rear surface of the divider 53 at the same angle as the first mentioned portion, and the greater part of it passing through or on in the same direction as it entered through the aperture 48. The filtering means provided in or at the divider 53 is such that it affects the light reflected by the rear surface 57 so that it is not registered by the film. In practice we employ a panchromatic film, which is about seven times as sensitive to violet as it is to all other colors. We may embody a yellow light filtering material in the body of the divider 53 so that the light reflected by the rear surface 57 is influenced by or toned yellow. Being predominantly sensitive to violet the film, when exposed to the light reflected by the divider 53, records, or registers, the parts of the subject which manifest themselves chromatically in colors influenced by violet, the recording of other colors being so slight that it is negligible. By adjusting the iris so that the film is exposed only enough to be properly exposed to violet other colors, for instance, those influenced by yellow, will not be recorded sufficiently to appear on the developed film.

The second light divider 54 is arranged immediately behind the first light divider 53 so that the shaft of light that passes through the first divider falls upon it. The light that passes on from the first divider is, of course, minus violet, in that the yellow filter by its complementary nature to violet has cut it out. The second divider 54 has a front reflective surface 58 and throws a shaft of light through the second lens device 14, through the second exposure aperture 17, and onto the second picture area of the film. The light that is not reflected by the surface 58 passes to the rear surface of the divider 54, part of it being reflected by the rear surface 59 of the body but the greater portion of it passing from the divider in the same direction as the shaft that enters through the aperture 48. The divider 54 is, like the divider 53, formed of glass, and has a suitable light filtering means in combination with it. For example, we will consider the divider 54 as having a red-orange light filtering means or color in it so that the light reflected by the rear surface 59 is toned red-orange. To cut out the light reflected by the rear surface a green filter 60 is arranged between the divider 54 and the film. This green filter passes the yellow light reflected by the front reflective surface and merely influences it by green, and being substantially complementary to the orange light reflected by the rear surface it cuts it out so that it does not pass through the film. The second divider having received a shaft of light holding the subject from which the violet sensation has been cut out reflects only those parts of the subject which chromatically manifest themselves in green and orange, but by interposing a green filter between the divider and the film the orange is cut out so that the film actually records only those parts of the subject which manifest themselves chromatically in colors influenced by green.

The shaft of light that passes through and continues from the divider 54 is, of course, influenced by or contains both yellow and red-orange, and is, therefore, predominantly orange. The green values have been cut out by the orange-red filter in the second divider. The reflector 55, which has a front reflective surface 60ª is arranged in an angular position immediately behind the divider 54 so that this shaft or orange light is reflected through the third lens device and exposure aperture onto the third picture area of the film. The reflector receives a shaft of light containing the subject and from which both the green and violet sensations have been cut out, so, therefore, the third picture area records only those parts of the subject which manifest themselves chromatically in colors influenced by orange. In practice the iris mechanisms are adjusted to obtain the desired relation between the exposures of the several pictures. By adjusting the iris mechanism the several exposures can be balanced or related in the desired manner.

Figure 3:
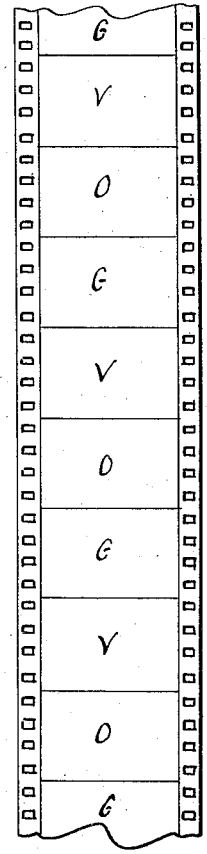
Fig. 3 is a view showing a piece of film such as is the product of our present method.

The film moving mechanism and shutter are related or timed so that the film is exposed through the exposure apertures in the plate 16ª during the periods when it is stationary. The movement mechanism moves the film a distance equal to the width of three pictures, or picture areas, upon each operation. As the result of the method of handling the light from the object and moving the film relative to the separated shafts of light the film has a plurality of series of spaced pictures on it, each series including three pictures of different colored portions of the subject and adjacent series being meshed together so that the spaces between pictures in each series are occupied by the end pictures of adjacent series. The arrangement and relation of the pictures on the film will be clearly understood from inspection of Fig. 3 of the drawings, in which case the letter O designates the pictures of the orange portions or values of the subject, the letter G pictures of the green portions or values of the subject, and the letter V pictures of the violet portions or values of the subject. The details of the film and also its features and advantages are fully set forth and claimed in our above mentioned copending application entitled Motion picture film, Serial No. 685,980.

From the foregoing description it will be apparent how the method provided by our present invention produces on the film a plurality of series of pictures, each series being taken simultaneously from exactly the same angle, including pictures of different colored portions of the subject and the series being related or meshed together on the film so that all of the available film space is occupied. The several images or pictures obtained or included in each series are very slightly different in size due to the difference in distances that the light has to travel from the subject to the several different parts of the film. Further, this slight difference is practically negligible and can be very easily compensated for in the method of printing or projecting employed in using the film after it has been exposed, developed, etc.

Having described only a typical preferred form of our invention we do not wish to limit ourselves to the specific details hereinabove set forth but wish to reserve to ourselves any changes or variations that may appear to those skilled in the art or fall within the scope of the following claim.

Having described our invention, we claim:

A motion picture camera including means for intermittently advancing a film, an aperture plate at the film and having three apertures spaced apart distances substantially equal to one picture area of the film, means for directing light through the apertures to expose the film including light dividing plates arranged directly in the path of light from the subject and in spaced relation one behind the other each operating to reflect part of the light through an aperture and a reflector spaced behind the dividers to direct the light passed by the divider through one of the apertures, and means whereby the light directed through the several apertures is different chromatically.

In witness that we claim the foregoing we have hereunto subscribed our names this 22nd day of January, 1924.

S. MACDONALD WRIGHT.
WALTER L. WRIGHT.